Feb. 28, 1939.  L. E. MARCHANT ET AL  2,148,567
DEVICE FOR THE CLASSIFICATION OF HANDWRITING
Filed March 20, 1936  3 Sheets-Sheet 1

INVENTORS
LAWRENCE E. MARCHANT.
STANLEY S. HERRING.

ATTORNEY

Feb. 28, 1939.   L. E. MARCHANT ET AL   2,148,567
DEVICE FOR THE CLASSIFICATION OF HANDWRITING
Filed March 20, 1936   3 Sheets-Sheet 2
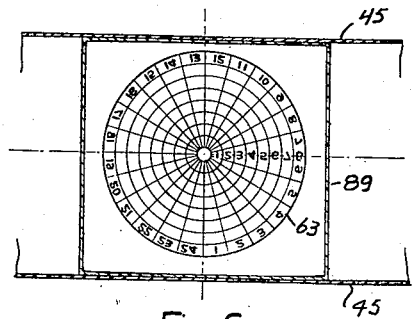
Fig. 6
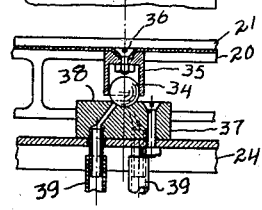
Fig. 5
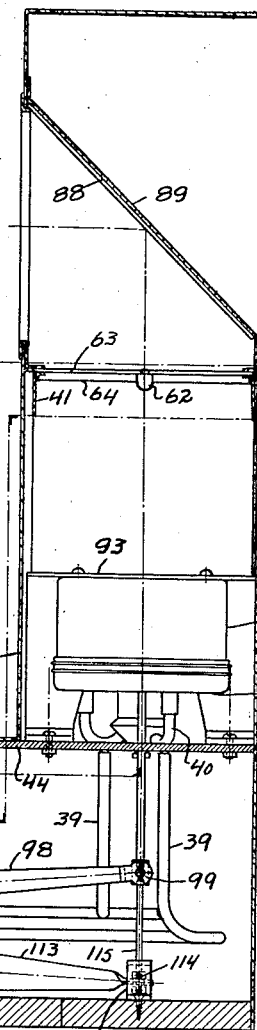
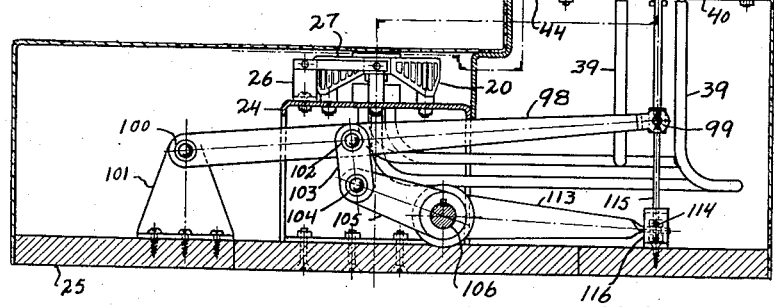
Fig. 4
Fig. 3
INVENTORS
LAWRENCE E. MARCHANT.
STANLEY S. HERRING
ATTORNEY Feb. 28, 1939.  L. E. MARCHANT ET AL  2,148,567
DEVICE FOR THE CLASSIFICATION OF HANDWRITING
Filed March 20, 1936  3 Sheets-Sheet 3
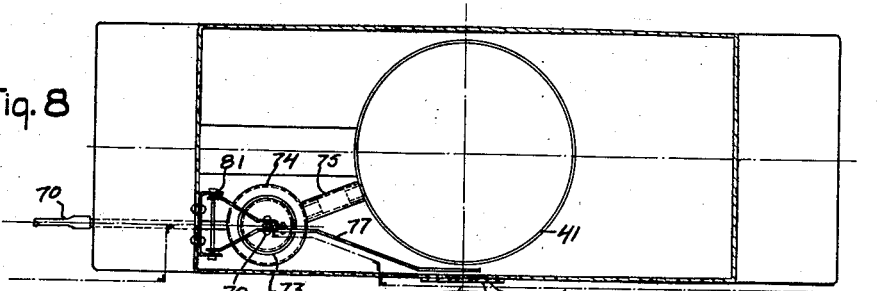
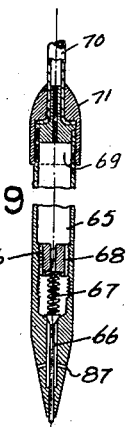
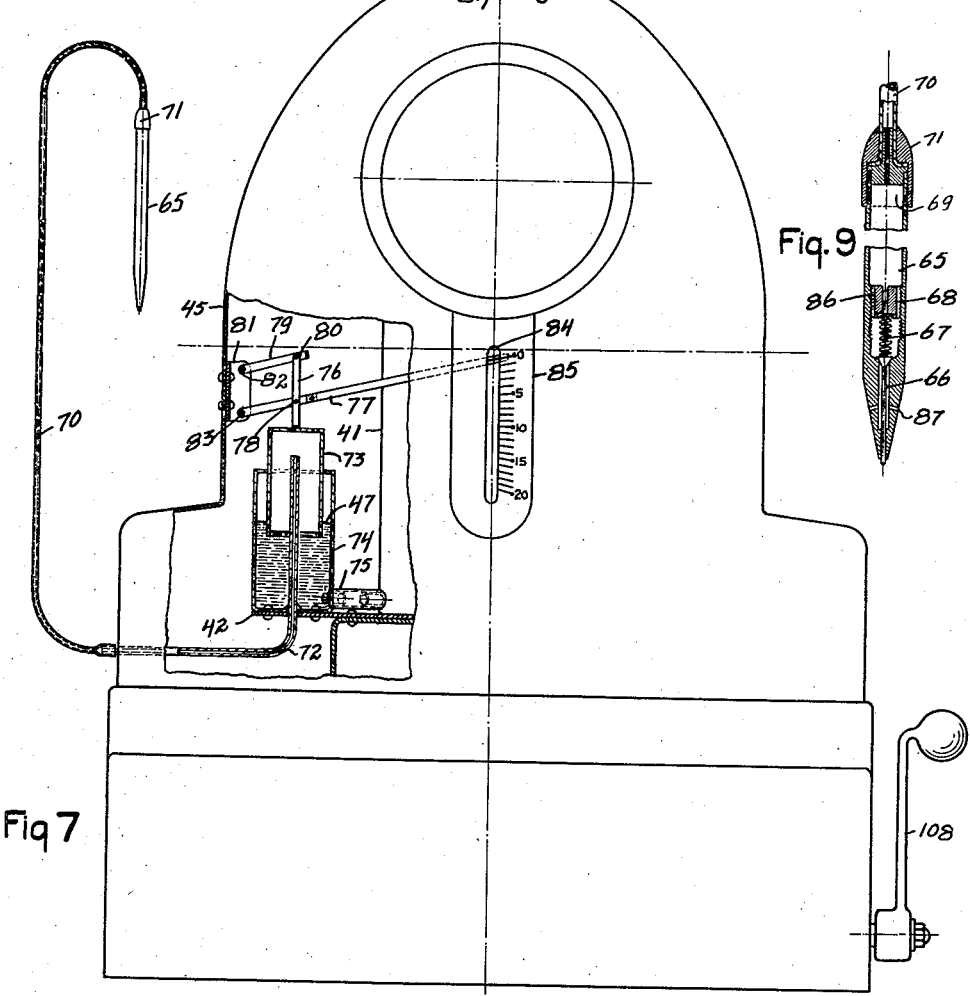
INVENTORS
LAWRENCE. E. MARCHANT.
STANLEY S. HERRING.
ATTORNEY Patented Feb. 28, 1939

2,148,567

UNITED STATES PATENT OFFICE 2,148,567

DEVICE FOR THE CLASSIFICATION OF HANDWRITING

Lawrence Edgar Marchant and Stanley Spargo Herring, Hamilton, Ontario, Canada

Application March 20, 1936, Serial No. 69,870

4 Claims. (Cl. 35—1)

Our invention relates to a device for the classification of handwriting and is particularly directed towards providing apparatus by means of which the various forces established in the act of writing can be integrated.

A person in the act of writing establishes three forces, namely the direction of pressure resulting from angularity or the normal angle at which a person writes, the duration of the pressure resulting from the normal speed of writing and the various downward pressures exerted on the writing surface and their relationship to the direction in which the writing instrument is moving.

Heretofore in order to recapitulate the various forces established by the act of writing it has been necessary to subject the handwriting to exhaustive analysis requiring a great deal of time and, at the same time, the results have not been conclusive.

One of the principal objects of our invention is to provide a machine by means of which the general force characteristics of a person's handwriting may be integrated and classified and from which a basis may be provided for comparing the actual character of any one of a group of people with the force characteristics as determined by the machine in order to ascertain definitely whether or not any relationship exists between a person's character and the forces involved in his or her act of writing.

A further object of our invention is to provide operating mechanism by means of which the writing instrument may be utilized to combine the forces resulting from the act of writing, such as downward pressure and speed, to co-operate with the mechanism provided in the writing surface to result in a clearly defined integrated indication of the handwriting.

A still further feature of our invention lies in the manner in which the mechanism after use returns to balanced position ready for further use.

A clear understanding of the features of our invention will be apparent from the following description and accompanying drawings in which:

Figure 3 is a vertical cross sectional view on the line 2—2 Figure 2.

Figure 4 is an enlarged vertical cross sectional view on 4—4 Figure 1.

Figure 5 is an enlarged top plan view of the three way float control valve seat with the table and sealing ball removed.

Figure 6 is a cross sectional elevation of the indicating dial.

Figure 7 is a cross sectional elevation of the writing mechanism.

Figure 8 is a cross sectional top plan view of the writing mechanism; and

Figure 9 is an enlarged cross sectional elevation of the stylus.

Like reference characters refer to like parts throughout the specification and the preferred embodiment of our invention illustrated in the drawings.

Figure 1:
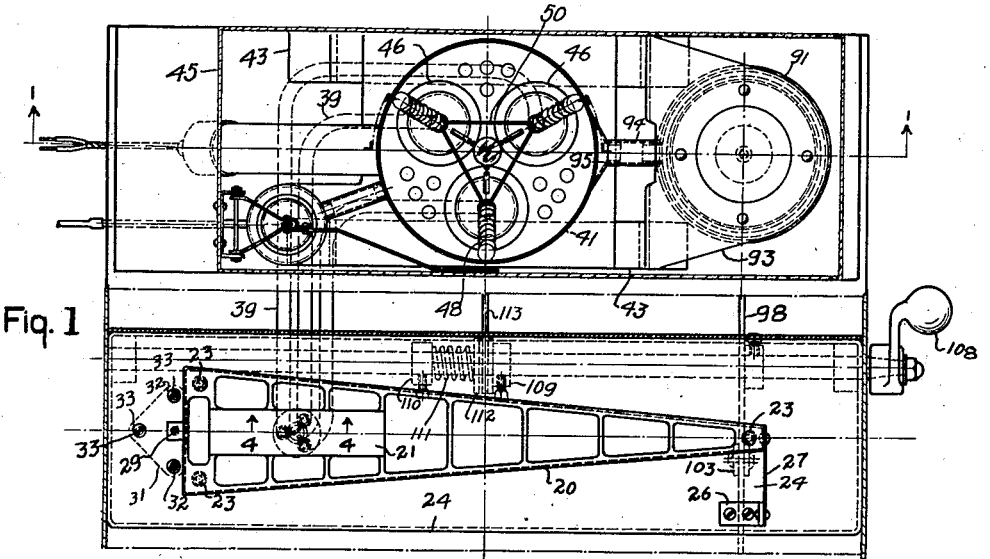
Figure 1 is a cross sectional top plan view of a device embodying our invention.

The movable table 20, carrying a writing surface 21, is supported on balls 22 which rest in concave topped posts 23 which in turn are carried on a support member 24 attached to the base 25. The movable table 20 is resiliently attached at one end, preferably by such means as the flexible spring strip 27, to a bracket 26 which is attached to or forms a part of the support member 24.

The movements of the table 20 are controlled by means of a resilient post 28 projecting through the hole 29 formed in the end of the table 20. The resilient post 28 is preferably anchored in the end of the adjusting screw 30 which is screwed through the plate 31. The plate 31 is adjustably attached to the support member 24 with screws 32. Compressible washers 33 are inserted between the plate 31 and support member 24 and are held in position by the screws 32.

Movements imparted to the table 20 by the action of writing on surface 21 are transferred to a valve sealing ball 34 by means of cylindrical sleeve 35 which is attached to the underside of movable table 20 by means of bolt 36. The valve sealing ball 34 rests in a concave seat in the top of the three way float control valve 37 held in position by support member 24. In the three way float control valve 37 are three equally spaced vents 38, the amount that each vent is opened is dependent on the distance and direction in which the sealing ball 34 is moved.

Connecting with the three vents 38 of the three way float control valve 37 by means of air tubes 39 and 40 is an indicating mechanism, partially contained in a cylindrical chamber 41 which is supported on plate 42 carried by brackets 43. The brackets 43 are attached to horizontal partition 44 carried by the external casing 45 of the machine.

The indicating mechanism consists of three cylindrical bottomless floats 46 which are buoyantly suspended in a liquid 47 by means of suspension springs 48 attached to the cylindrical chamber 41 by means of clips 49 and interconnected triangularly by means of flexible cords 50. A plate 53, supporting a reflecting surface 54 is suspended from the floats 46 by means of projecting arms 51 and flexible cords 52, the three points of suspension of plate 53 being equally spaced.

An electric light bulb 56 is held in position in the light tube 57 by means of a socket 58, the wires 55 being connected to an external supply of electrical energy. The light 56, diaphragm plate 59 and lenses 60 are used to produce a parallel beam of light 61 which is reflected by a reflecting surface 62 attached to the underside of translucent dial 63 which in turn is supported in the top of the cylindrical float chamber 41 by means of support ring 64.

The parallel beam of light 61 is reflected downward by reflecting surface 62 to reflecting surface 54 which reflects it toward the translucent indicator dial 63.

The point at which the parallel beam of light 61 strikes the translucent indicator dial 63 is dependent on the deflection of the reflecting surface 54 by the change in the relative buoyancy and position of the three bottomless floats 46 resulting from the difference in the amount of air released from inside each of the floats 46 through the three upper air tubes 39 to the three vents 38 of the three way float control valve 37. The difference in the amount of air released from inside each of the three bottomless floats 46 occurs when the movements induced into the movable table 20, by the act of writing on surface 21, are predominantly in any particular direction thereby imparting through sleeve 35 a predominance of similar movements to the sealing ball 34, which produces related variations in the extent to which each of the vents 38 is opened.

A description of the mechanism used for producing the indication resulting from the pressure and speed of the motions used to produce the writing being classified is as follows:

The writing stylus shown in Figure 9 in the drawings, consists of a barrel 65, containing a central stem 66, the lower end of which forms the writing tip and the upper end of which forms a valve seated in the barrel 65 and tending to be closed by spring 67 reacting against adjusting plug 68 which is screwed into the barrel 65. Inserted in the upper end of the barrel 65 is a nipple 69 to which is attached one end of the flexible air tube 70 by means of sleeve 71 which is screwed onto the barrel 65. The other end of the flexible air tube 70 is connected to central air tube 72 which projects upward into the air space formed by the bottomless float 73 floating in the liquid 47, in the cylindrical chamber 74 which is supported by plate 42 attached to brackets 43, and connected to cylindrical chamber 41, shown in Figure 1 in the drawings, by means of connecting tube 75.

Attached to the top of the bottomless float 73 is a vertical bar 76 connected to the indicator arm 77 by means of a pivot pin 78.

The vertical bar 76 together with the bottomless float 73 are maintained in a vertical position by means of guide link 79 to which vertical bar 76 is connected by pivot pin 80. Guide link 79 is connected to bracket 81 by means of pivot pin 82, bracket 81 is attached to the outer casing 45 of the machine.

Indicator arm 77 is connected at one end to bracket 81 by means of pivot pin 83, the other end of indicator arm 77 is visible through the slot 84 in the plate 85 which is graduated to indicate the amount of downward movement of the bottomless float 73. The downward movement of the bottomless float 73 is caused by the releasing of the air inside, through air tube 73 connected to air tube 70 which is connected to the stylus, shown in Figure 9 in the drawings. The air passes down through nipple 69 of the stylus and down the inside of the barrel 65, through the slots 86 in the side of adjusting plug 68, then passes the valve on central stem 66 which is opened to a varying extent, depending on the pressure applied to the writing tip of the central stem 66 by the act of writing. The air is then free to escape through vent holes 87 in the lower end of the barrel 65.

With the connection of wires 55 to an external source of electrical energy, the mechanism as shown in the drawings is ready for use by writing with the stylus, shown in Figure 9, on the surface 21.

Figure 2:
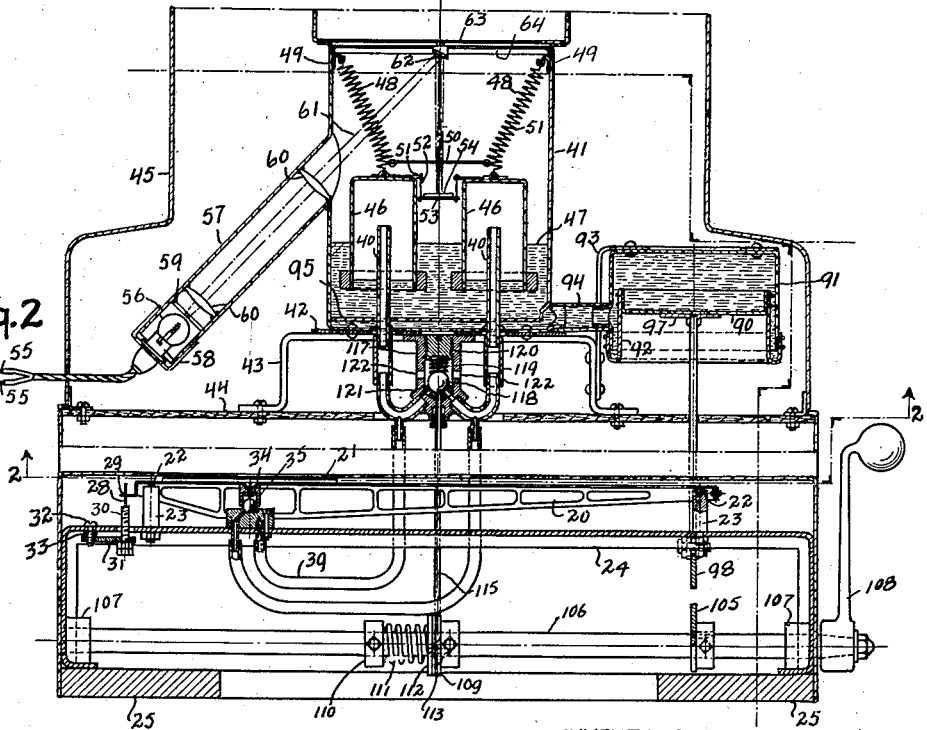
Figure 2 is a cross sectional elevation along the line 1—1 Figure 1.

After writing on the tablet 21 and obtaining the reading indicated by the position of the spot of light on the graduated translucent dial 63, shown in Figure 6, which for ease of observation is reflected in mirror 88 attached at an angle to the support hood 89, attached to the external casing 45 of the machine; and also obtaining the reading indicated by the position of the indicator arm 77 in relation to the graduations on plate 85, shown in Figure 7, it is necessary to reset the mechanism for future use, which is accomplished as follows:

The level of the liquid 47 in chambers 41 and 74 is lowered until it is below the bottom edge of float 73, Figure 7, and yet above the bottom edges of floats 46, Figure 2, by lowering the piston 90, which operates in and is attached to the bottom edge of chamber 91 by means of introvertible sleeve 92. The chamber 91 is supported by bracket 93 which is secured to the support brackets 43, and connected to chamber 41 by means of the connecting tube 94 which terminates under the baffle 95 used to prevent surging of the liquid 47 in chamber 41. The piston 90 is connected to the upper end of rod 96 by means of connecting flange 97. The bottom end of rod 96 is connected to one end of lever 98 by means of pivot pin 99. The other end of lever 98 is connected by means of pin 100 to the fulcrum 101, attached to base 25. Connected to lever 98 by means of pin 102 are links 103 the lower ends of which are connected by means of pin 104 to lever 105 which is fixed to shaft 106. The shaft 106 is journalled in bearings 107 formed in the support member 24 and projects through the external casing 45. To the outer end of shaft 106 is attached operating handle 108 which is pulled forward to lower piston 90 by means of the previously described lever system.

The friction flange 109 is attached to and turns with the shaft 106. The valve operating lever 113 is held against the flange 109 by means of the collar 110, the spring 111 and the washer 112. The valve operating lever 113 actuates the valve operating rod 115 within the limits of stop bracket 116 by means of the stop collars 114.

The upper end of rod 115 is guided by the body of the equalizing valve 117 supported by the plate 42, and when raised comes in contact with, and lifts ball 118, which has been held on its seat by spring 119. The spring 119 reacts against plug 120 screwed into the valve body 117. The lifting of ball 118 opens ports 121 connected to the three upper air tubes 40, thereby allowing the pressure in the three floats 46 to be equalized at atmospheric pressure through vents 122 in the valve body 117.

The equalizing of the pressure in floats 46 takes place at the same time as the level of the liquid 47 is lowered by the downward movement of piston 90.

To complete the operation of resetting the mechanism for use, the operating handle 108 is pushed back into the position shown in the drawings. During the initial part of this backward stroke the ball 118 is dropped into its seat, closing the ports 121 and thereby sealing the floats 46 one from the other. As the stroke progresses the level of the liquid 47 is raised, sealing the bottom end of float 73 and raising it, together with floats 46 into the position shown in the drawings at the completion of the backward stroke.

The forces set up by the act of writing on the tablet or writing surface 21 are those caused by pressure, angularity, direction of pressure and speed of writing and are transposed into degrees of deflection as shown by the point at which the beam of light reflected by the reflecting surface 54 strikes the translucent calibrated indicator dial 63.

The forces set up by writing with the stylus tip 66 are caused by pressure and speed of writing and are transposed into degrees of deflection as shown by the relation of indicator arm 77 to the graduations on plate 85.

The act of writing on the tablet or writing surface 21 with the stylus tip 66 establishes forces which are integrated into two indications, one being the point at which the beam of light reflected by the reflecting surface 54 strikes the translucent calibrated indicator 63 and the other by the relation of the indicator arm 77 to the graduations on plate 85.

It will be appreciated, of course, that in order to be accurate in the integration of the forces established by the act of writing that each person using the machine must write the same word or sequence of words.

It will also be clearly understood, of course, that modifications may be made in the preferred mechanism hereinbefore described and illustrated, by those skilled in the art, without departing from the scope of our invention.

Having thus fully described our invention what we claim is new and desire to secure by Letters Patent is:

1. In a mechanism for indicating the classification of handwriting an indicator, an indicator control unit, a plurality of buoyant floats suspended in a liquid and grouped around and connected to said indicator control unit, a float control valve comprising a seat having a plurality of concentrically arranged ports and a movable central control member controlling the amount of opening of said ports, each of said ports cooperating with and tending to change the position of one of the plurality of buoyant floats when opened by the movements of said central control member, a movable table supporting a writing surface, means for imparting to said movable central control member the motions induced in said movable table by the act of writing on said surface.

2. In a device of the class described, a writing surface, means for supporting said writing surface, which means permit the horizontal and vertical movement of said writing surface, an indicator adapted to move across a graduated scale, means for actuating the movement of said indicator relative to the horizontal and vertical movement of said writing surface.

3. In a device of the class described, a writing surface, means for supporting said writing surface, which means permit the horizontal and vertical movement of said writing surface, an indicator adapted to move across a graduated scale, means for actuating the movement of said indicator relative to the horizontal and vertical movement of said writing surface, a stylus adapted to move over said writing surface, means for integrating the forces established in said stylus by the act of writing on said writing surface, a second indicator adapted to move over a graduated scale and means for actuating the movement of said second indicator relative to the integrated forces established in said stylus.

4. In a device of the class described, a writing surface, means for supporting said writing surface which means permit the horizontal and vertical movement of said writing surface, an indicator adapted to move across a graduated scale, means for actuating the movement of said indicator relative to the horizontal and vertical movement of said writing surface, a stylus adapted to move over said writing surface, means for integrating the forces established in said stylus by the act of writing comprising a bored body member, a writing tip inserted into said body member having one end extending outwardly therefrom, a valve member located in said body member actuated by the pressure exerted on said writing tip, a valve closing spring normally resisting the movement of said valve member, a second indicator adapted to move over a graduated scale, and means for actuating the movement of said second indicator across its scale relative to the movement of said valve member.

LAWRENCE EDGAR MARCHANT.
STANLEY SPARGO HERRING.